July 23, 1957     C. D. VANDENBURGH     2,800,072
CYLINDRICAL PRESS ASSEMBLY
Filed April 28, 1954

United States Patent Office 2,800,072
Patented July 23, 1957

2,800,072
CYLINDRICAL PRESS ASSEMBLY

Charles D. Vandenburgh, Charlestown, Md., assignor to American Viscose Corporation, Philadelphia, Pa., a corporation of Delaware Application April 28, 1954, Serial No. 426,066

11 Claims. (Cl. 100—127)

The present invention relates to presses and particularly to those characterized by a barrel containing a reciprocal piston or rotatable helical conveyor for urging a liquid-solid mixture toward one end of the barrel whereby the mixture is compressed to force the liquid from the barrel and through filter media comprising an inner surface of the barrel. The present invention is concerned more specifically with the structures of a filter unit and a press barrel adapted to support the unit so that its inner surface defines a portion of the cavity traversed by the compressing means, i. e., the reciprocal piston or the rotatable helical member.

In accordance with the traditional practice in viscose manufacturing, cellulose pulp supplied in sheets is treated with an alkali solution in a "steeping" press which consists essentially of a tank and a conventional plate and frame filter press supported therein. After a steeping period in which the cellulose pulp is substantially alkalized, the tank is drained and the pulp is pressed by the operation of the ram thereof to express additional liquid from the pulp. This type of press is relatively free from filter clogging troubles but is not satisfactory for the processing of cellulose fiber in a continuous viscose manufacturing process.

The separation of the alkaline solution from the alkalized pulp by piston or screw type presses of conventional construction presents considerable difficulty because of the presence of hemi-cellulose and fine fibrous material which are squeezed out of a mass of treated pulp, and eventually clog the filter media. In using the piston or screw type filter, it is necessary to be able to replace the filter media frequently and easily. The conventional design involves more or less dismantling of the press and/or the cleaning of portions thereof before clean filter media may be installed.

It is an object of this invention to provide a filter press comprising a barrel and a movable compressing member housed therein, such as a piston or a screw conveyor, the barrel having a filter unit which may be readily replaced without any cleaning or servicing of the press, or the need for removing any portion of the press other than the filter unit. A specific object is to construct a filter press and a filtering unit therefor in such a manner as to prevent the filtrate and the pressed product of the press from coming into contact with surfaces of the press wall on which the filter unit is supported whereby such supporting surfaces are maintained clean and thus non-obstructive with respect to the removal of the unit.

Other objects, features, and advantages will become apparent from the following description of the invention and the drawings relating thereto in which Fig. 1 is an elevation illustrating a press comprising a filtering unit and a supporting barrel therefor having a section of its wall broken away;

For purposes of illustration and simplicity of description, the invention is hereinafter described with respect to a piston type press which has proved especially satisfactory to pressing alkali solution from a slurry of pulp in pressing pulp for use in the manufacturing of a film or filament-forming viscose solution. The invention is not intended to be limited by the specific description except in so far as the invention may be limited in the appended claims.

The present invention resides in a filter press characterized by the combination of a cylinder adapted to receive a charge of liquid-solid mixture and to house a member for compressing the load within the cylinder, such as a rotatable screw or a reciprocable piston, and an annular filter unit adapted to fit in an annular recess of the lateral wall of the cylinder. The recess extends concentrically from one end of the cylinder wall to a shoulder spaced between the ends of the wall. The inner surface of the filter unit extends as a continuation of the inner surface of the cylinder traversed by the compressing member. The annular wall of the unit comprises an outer annular impermeable section adapted to engage the recessed wall surface of the press cylinder for support, and an inner permeable section in concentric and substantially coextensive relation with the outer section. The outer section provides radial support for the inner section but both sections are engaged in generally-distributed interrupted relationship to provide passageways between the sections through which liquid having passed through the inner section may drain longitudinally through the unit between the sections. The open surfaces are contiguous with one or more drainage passageways through the lateral wall of the press cylinder extending from the inner shoulder to an exterior surface of the cylinder. In a preferred embodiment, the inner section comprises a pair of perforated rigid sleeves separated by a concentric layer of fabric.

Figure 1:
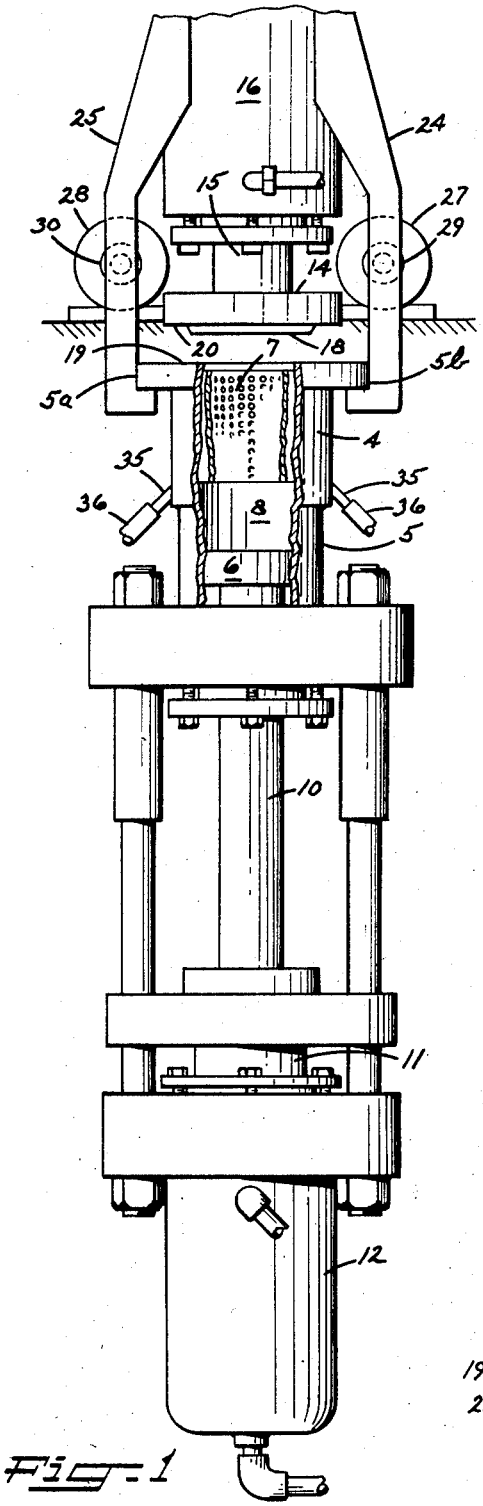

A filter press incorporating the invention is shown in Fig. 1 having a wall 4 of the process cylinder 5 broken away to expose a piston 6 and a filter unit 7 which fits within an upper portion of the cylinder. The piston 6 is operated by a push rod 10 extending from the ram 11 of the cylinder 12. The inner peripheral surface of the unit 7 and the inner surface 8 of the lower portion of the process cylinder are uniform in transverse cross section and complementary in cross section to the peripheral surface of the piston 6. The process cylinder 5 has a retractable head or closure 14 mounted on the end of a ram 15 of a hydraulically operated cylinder 16. The head 14 is shown retracted upwardly from its seat at the top of the cylinder 5. However, when the head is moved downwardly and brought into engagement with the end surface of the filter unit 7, the annular surface 20 of the head 14 has a slight clearance with the end surface 19 of the cylinder when the under surface of the boss 18 engages the unit and the unit is held tightly in position between the head 14 and the supporting shoulder 22 within the cylinder 5 (see Fig. 2). As shown, the filter unit 7 does not quite extend the full length of the recess provided therefor in the wall 5. The upper end surface of the unit is thus disposed slightly below the top or end surface 19 of the wall 4. It is necessary to provide the head 14 with a boss of slightly less diameter than that of the recess which receives the unit but of slightly greater height difference than that between the levels of the end surfaces of the unit and the cylinder. The head 14 may thus seat on the unit for the purposes of sealing the process cylinder and holding the assembly of parts constituting the filter unit together during a compression stroke of the piston.

The main support for the assembly comprising the cylinder 16, the ram 15, the head 14, and a pair of arms 24 and 25 attached to the wall of the cylinder 16 is a pair of hydraulically operated cylinders 27 and 28 which have piston rods 29 and 30, respectively, anchored in the arms 24 and 25. The arms 24 and 25 extend downwardly from their point of attachment to the cylinder 16 around and under opposite overhanging guide portions 5a and 5b when the head-supporting assembly is positioned over the process cylinder 5. In the retracted position of the head 14, the entire head-supporting assembly may be moved to a position offset with respect to the top of the cylinder 5 by operation of the cylinders 27 and 28. In this position of the head-supporting assembly the filter unit 7 may be withdrawn from the cylinder 5 without hindrance.

Referring now in detail to the construction of the filter unit 7 and the inner structure of the cylinder 5 which supports the unit, it is to be noted that the cylinder is recessed from one end to a depth substantially equal to that of the axial length of the unit to provide the supporting shoulder 22. To receive liquid from the filter unit, an annular canal 33 is formed along the entire circumferential length of the shoulder. The wall of the cylinder contains one or more ducts 34 which drain the liquid from the canal 33 and the unit 7. As illustrated, the press of Fig. 1 has two of such ducts, each of which is counterbored to receive a nipple 35 which may be connected to flexible drain tubes 36. The inner surface of the cylinder defining the peripheral surface 37 of the recess and the outer peripheral surface 38 of the unit are slightly tapered to a diameter adjacent the shoulder 22 slightly smaller than the diameter of the surface 37 along its upper margin at 39. This arrangement permits the unit to be readily slipped into place and removed. Its removal is facilitated by holes in the wall 4, such as an aperture 41 which registers with an annular recess 42 in the outer surface of the unit. A screwdriver or punch may be inserted through the hole 41 into the recess 42. The unit 7 is thereafter broken loose from its seating position by prying with the punch or screw-driver.

The unit comprises a plurality of concentric members, namely an inner permeable section comprising, an inner metallic sleeve 44 having many small apertures extending therethrough, another metallic sleeve 46 having substantially larger apertures than the sleeve 44, a fabric sleeve 45 fitting concentrically between the exterior peripheral surface of the sleeve ring 44 and the interior peripheral surface of the sleeve 46, and an outer impermeable section comprising an outer supporting sleeve 47 having a smooth outer peripheral surface but a longitudinally ridged or corrugated inner peripheral surface which defines a large plurality of parallel ridges and valleys extending axially with respect to the axis of the press cylinder. The valleys thus defined provide drainage ducts extending the entire length and circumference of the filter 7 which are contiguous with the canal 33 of the shoulder 22. It is essential that the sleeves 44, 46, and 47 be fabricated from a rigid material, though not necessarily of metal, of sufficient strength and thickness to withstand without deformation the forces and pressures generated, for example, at 3,000 pounds per inch.

Figure 2:
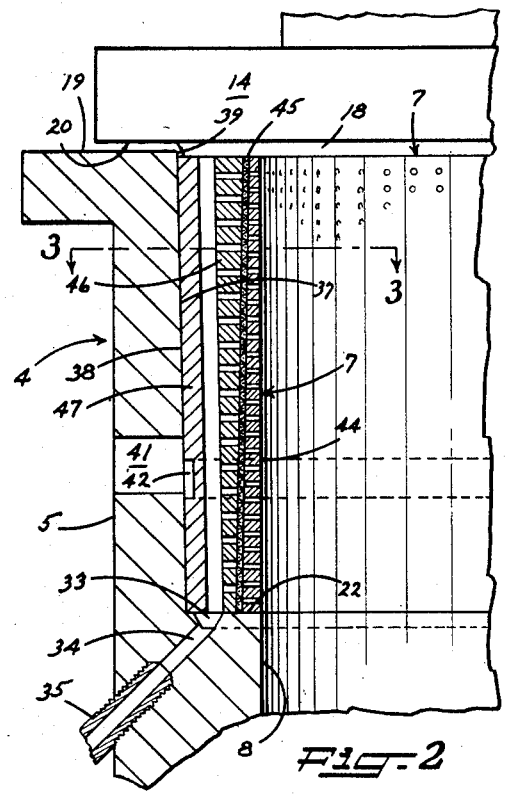
Fig. 2 is a fragmentary section view of the filter unit and an adjacent portion of the barrel shown in Fig. 1.
Figure 3:
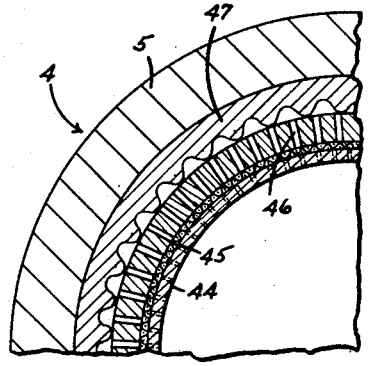
Fig. 3 is a fragmentary section view of the filter unit and the barrel taken along line III—III of Fig. 2.

Preferably, the unit is constructed with each member thereof having a characteristic taper along its outer or inner peripheral surfaces or both of such surfaces to facilitate the assembling of the unit. For example, the outer supporting sleeve 47 may have the same taper along its inner surface as it has along its outer peripheral surface 38. The perforated sleeve 46 which fits within the supporting sleeve 47 has a complementary taper along its outer peripheral surface. However, in a preferred embodiment of the invention, and as shown in Fig. 2, the sleeve 46 has a taper that is reverse with respect to the taper of its outer surface. A cross section of such wall is thus wedge-shaped. The exterior peripheral surface of the sleeve 44 fits generally within the inner surface of the sleeve 46 with a separate layer of fabric interposed concentrically therebetween, and thus has the same taper as the interior surface of the sleeve 46. The interior surface of the sleeve 44 is preferably truly cylindrical and is accurately machined to the same diameter as that of the inner surface 8 of the cylinder 5, the diameter thereof being within a few thousands of an inch greater than that of the piston 6 which reciprocates through the cylindrical cavity thus defined. As a preferred construction, the shoulder surface 22 extends radially, except for the canal 33, into juncture with the surface 37 within a plane normal to the axis of the process cylinder. The sleeves 44, 46, and 47 are constructed accurately to the same length so that the end surfaces of the sleeves engaged by the head 14 present a substantially flat annular surface on which the head seats circumferentially continuously on the end surfaces of the sleeves. In order to form a seal for the cavity, it is particularly important that the head seat along the entire circumference of the sleeve 47.

As an example of a satisfactory unit for filtering alkali cellulose, the sleeve 44 may be fabricated from stainless steel which is $1/16$ inch thick at its upper end and $1/8$ inch thick at its lower end. It is perforated throughout with holes having a diameter of $1/32$ inch spaced to provide a hole for each $1/4$ square inch of area of the sleeve. The sleeve 44 as well as the sleeve 46 may be fabricated either as a cylinder or a sheet formed into a cylinder and then welded. The latter method is more economical. The fabric layer 45 may be of woven or non-woven construction and comprises fibers selected for their chemical inertness with respect to the material to be handled, such as artificial fibers comprising spun glass, nylon, or fibers of the vinyl resins such as polyvinyl chloride, polyvinylidene chloride, polyvinyl acetate, and/or mixtures thereof or natural fibers such as cotton, linen, hemp, etc. At high press pressures, woven fabrics constructed of glass or nylon fibers are most satisfactory.

The sleeve 46 may vary in thickness from $1/16$ of an inch at its lower edge to $3/16$ of an inch at its upper edge. The sleeve 46 is perforated with holes which are preferably larger than the holes of the sleeve 44 and displace a greater portion of the surface of the sleeve 46 than the holes of the sleeve 44 displace in the sleeve 44. The holes of the sleeve 46, may, for example, be $1/16$ inch in diameter with one hole in each half square inch of area. If the holes are arranged in longitudinal rows, the spacing of the rows is such that such spacing is not evenly divisible into, or evenly divisible by, the spacing of the corrugations along the inner surface of the sleeve 47. This is to avoid the occurrence of many rows of holes being disposed on top of ridges of the sleeve 47.

The overall thickness of the supporting sleeve 47, as measured from its exterior periphery through a ridge of its corrugated section, may be in the neighborhood of $1/2$ inch. Such thicknesses and proportions are suitable in a press having a piston diameter of approximately 6 inches operating at pressures up to 3,000 pounds per square inch or more. These dimensions, while found to be satisfactory, are not critical and may be varied within the limits of safety.

Figure 4:
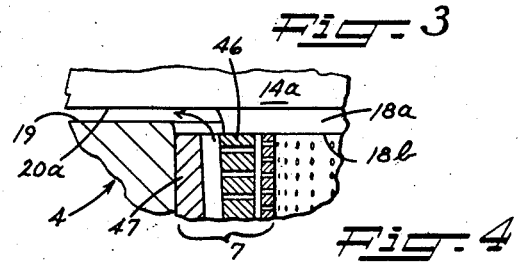
Fig. 4 is a fragmentary section view of a press having a modified head.

As an optional construction of a press, partial or entire drainage of liquid from the filter unit 7 may be obtained, as shown in Fig. 4, by providing a cylinder head 14a having the same general construction and support as the cylinder head 14 of Figs. 1 and 2 but having a protruding portion 18a which does not cover the ends of the passageways provided by the corrugated interior surface of the sleeve 47. That is to say, the extreme diameter of the downwardly-facing flat surface 18b of the boss 18a is not appreciably greater than that of the outer peripheral surface of the sleeve 46. Liquid forced through sleeves 44, 45, and 46 thereby escapes along the corrugated surface and outwardly between the end surface 19 of the wall 4 and the surface 20a of the head.

The filter unit hereinbefore described is designed to operate at high pressures such as necessary to obtain separation, in alkali cellulose pulp, in the neighborhood of 2 to 1.75 parts of solution to 1 part of alkali pulp (dry basis) in the pressed product. The maximum efficiency of the filter is obtained after several cycles of the piston at which time a mat comprising fine fibers of the pulp is collected in the apertures of the ring 44 and at the interface of this ring with the fabric layer 45. A high degree of separation of the solid material from the liquid-solid mixture charged to the press is effected as a result of the formation of this mat. However, after a service period which depends on the nature of the slurry handled, the collection of impurities and hemi-cellulose within the mat tends to render the filter unit progressively more impermeable to the liquid until excessive pressures are required to force the liquid through the unit. When the pressure required attains a certain level considered uneconomical, the unit is replaced. To utilize the full advantage of this invention, it is desirable to have replacement units readily available which may be instantaneously inserted upon removal of a used unit. Reconditioning of a unit merely involves replacement of the fabric layer and cleaning out the plugged apertures of the innermost ring 44, and reassembling thereof as shown in Fig. 2.

While preferred embodiments of the invention have been shown and described, it is to be understood that changes and variations may be made without departing from the spirit and scope of the invention as defined in the appended claims.

I claim:

1. In a filter press having a load-receiving cavity and a reciprocable load-compressing member movable within said cavity to force a charge of liquid-solid mixture toward one end thereof, the combination of a filter unit and a wall of the press, each extending longitudinally with respect to a common central axis, the wall having an inner peripheral surface in end-to-end relation with the inner peripheral surface of the unit to define said cavity with the axis extending centrally therethrough, said surfaces being of uniform size and contour substantially throughout the entire length of the cavity and the periphery of the member conforming closely to said cross section, said inner peripheral surface of the wall having a concentric recessed surface extending longitudinally from one end thereof for receiving the filter unit terminating at a shoulder located between the ends of the wall; the filter unit comprising an outer liquid-impermeable section having an outer peripheral surface in tightly-fitting substantially-coextensive relation with said recessed surface, an inner liquid-permeable section extending in concentric substantially-coextensive relation with the outer section, the exterior peripheral surface of the inner section being in generally distributed but interrupted contact with the inner surface of the outer section to provide open spaces therebetween extending longitudinally through the unit between the two sections for the passage of liquid, liquid-conducting means extending from an outer surface of the wall to an end of the unit for draining said open spaces within the unit; a closure for said one end of the cavity and, means for movably supporting the closure in bearing relation with an end surface of the assembly comprising the filter unit and the wall and other positions out of engagement with the end surface of said assembly, said unit being removable bodily from the wall in an axial direction upon withdrawal of the closure from a position immediately over said cavity.

2. In a filter press as defined in claim 1 wherein the inner section comprises two concentric rigid separable sleeves and a fabric sleeve extending between the two rigid sleeves in concentric relation therewith.

3. In a filter press having a load-receiving cavity and a reciprocable load-compressing member movable within said cavity to force a charge of liquid-solid mixture toward one end thereof, the combination of an annular filter unit and a circular wall of the press, each extending longitudinally with respect to a common central axis, the wall having an inner peripheral surface in end-to-end relation with the inner peripheral surface of the unit to define said cavity with the axis extending centrally therethrough, the diameters of said surfaces being equal along substantially the entire length of the cavity and the periphery of said member conforming closely to the circumference of said surfaces, said inner peripheral surface of the wall having a concentric circular recessed surface extending longitudinally from one end thereof for receiving the filter unit, said recessed surface terminating at a shoulder located between the ends of the wall; the filter unit comprising an outer annular liquid impermeable section having its outer periphery in tightly-fitting substantially-coextensive relation with said recessed surface, an inner annular liquid permeable section extending in concentric substantially-coextensive relation with the outer section, the exterior peripheral surface of the inner section being in generally distributed but interrupted contact with the inner surface of the outer section to provide open spaces extending longitudinally through the unit between the two sections for the passage of liquid, the wall having drainage passageways extending through an outer surface thereof from the shoulder; a closure for said end of the cavity; and, means for movably supporting the closure in continuous circumferential bearing relation with at least the end surface of the outer section of the filter unit adjacent said end surface of the wall and other positions out of engagement with the end surface of said assembly, said unit being removable bodily from the wall in the axial direction upon withdrawal of the closure from a position immediately over said cavity.

4. In a filter press as defined in claim 3 wherein the recessed wall surface tapers from the end of the wall to a slightly smaller diameter at its junction with said shoulder, and the outer surface of the outer section is complementary to the recessed surface.

5. In a filter press as defined in claim 3 wherein the recessed surface of the wall tapers from the end of the wall to a slightly smaller diameter at the junction thereof with the shoulder, and the outer tapered section has an outer surface complementary to the recessed wall surface, the outer section having its inner peripheral surface also tapered slightly to provide a larger diameter at one end than at the other end of the section, and the inner section having its outer surface tapered complementarily to provide substantial contact of the two sections.

6. In a filter press as defined in claim 3 wherein said shoulder comprises a grooved surface extending along the entire circumference of the wall and said drainage passageways extend from said grooved surface to the outer surface of the wall.

7. In a filter press having a cylindrical load-receiving cavity and a reciprocable piston for forcing a charge of liquid-solid mixture toward one end of the cavity, the combination of an annular filter unit and a cylindrical wall of the press, each extending longitudinally with respect to a common axis, the wall having an inner circular surface in end-to-end relation with the inner peripheral surface of the unit to define said cavity, said inner circular surface of the wall having a concentric recessed surface extending longitudinally from one end thereof for receiving the filter unit, said recessed surface extending to a shoulder located between the ends of the wall; the filter unit comprising an outer annular liquid impermeable section having an outer periphery in tightly-fitting substantially-coextensive relation with said recessed surface, an inner annular liquid permeable section extending in concentric coextensive relation with the outer section, the exterior peripheral surface of the inner section being in generally distributed but interrupted contact with the inner surface of the outer section to provide open spaces therebetween extending longitudinally through the unit between the two sections for the passage of liquid, the wall having drainage passages extending through an outer surface thereof from the shoulder; a closure for said end of the cavity and, means for movably supporting the closure in bearing relation with end surfaces of said sections of the unit and other positions out of engagement with the end surfaces of said unit, said unit being removable bodily from the wall in an axial direction upon withdrawal of the closure from a position immediately over said cavity.

8. In a filter press as defined in claim 7 wherein the inner section comprises two concentric rigid separable sleeves and a fabric sleeve extending between the two rigid sleeves in concentric relation therewith.

9. In a filter press having a load-receiving cavity and a load-compressing member reciprocable within said cavity to force a charge of liquid-solid mixture toward one end thereof, the combination of a filter unit and a wall of the press, each extending longitudinally with respect to a common central axis, the wall having an inner peripheral surface in end-to-end relation with the inner peripheral surface of the unit to define said cavity with the axis extending centrally therethrough, said surfaces being of uniform size and contour substantially throughout the entire length of the cavity and the periphery of the member conforming closely to said cross section said inner peripheral surface of the wall having a concentric recessed surface extending longitudinally from one end thereof for receiving the filter unit, said recessed surface terminating at a shoulder located between the ends of the wall; the filter unit comprising an outer liquid-impermeable section having an outer peripheral surface in tightly-fitting substantially-coextensive relation with said recessed surface, an inner liquid-permeable section extending in concentric substantially-coextensive relation with the outer section, the outer section being disposed in substantially circumferential engagement with the inner section along a common interface, the peripheral surface of one of the sections at the interface being corrugated to provide ridges and valleys extending parallel to the axis, said valleys constituting passageways for the passage of liquid longitudinally through the unit, the wall having drainage passageways extending through an outer surface thereof from the shoulder; a cylinder head for sealing the end of the cavity, and means for movably supporting the cylinder head in engagement with the end of the unit and in other positions removed therefrom to permit withdrawal of the press load and filter unit.

10. In a filter press having a cylindrical load-receiving cavity and a piston movable within said cavity to force a charge of liquid-solid mixture toward one end thereof, the combination of an annular filter unit and a circular wall of the press, each extending longitudinally with respect to a common axis, the wall having an inner cylindrical surface in end-to-end relation with an inner cylindrical surface of the unit of like diameter to define said cavity, said inner cylindrical surface of the wall having a concentric recessed circular surface extending longitudinally from one end thereof which receives the filter unit, said recessed surface terminating at a shoulder located between the ends of the wall; the filter unit comprising an outer liquid-impermeable section having an outer peripheral surface in tightly-fitting substantially-coextensive relation with said recessed surface, the recessed surface and the outer surface of the section being tapered to a smaller diameter at their ends nearest the shoulder, an inner annular liquid-permeable section of the unit extending in concentric substantially-coextensive relation with the outer section, the exterior peripheral surface of the inner section being in generally distributed but interrupted contact with the inner surface of the outer section to provide open spaces therebetween extending longitudinally through the unit between the two sections for the passage of liquid, the wall having passageways extending from an outer surface thereof to the shoulder; a retractable head for engaging an end surface of the assembly comprising the filter unit and the wall; and means for supporting the head along an ambit extending toward and away from the end surface of said assembly including said position of engagement with the end surface.

11. The combination of a filter press comprising a piston, a cylinder having an annular recess concentric to the inner peripheral surface traversed by the piston and extending from one end of the cylinder partially lengthwise thereof and terminating in an annular shoulder, a cylinder head for engaging said recessed end of the cylinder, an annular filter unit fitting tightly within said recess and extending from the shoulder to said head in the normal position thereof in engagement with the cylinder; the filter unit comprising an outer annular liquid-impermeable section having an outer peripheral surface in tightly-fitting relation with the surface of said annular recess, an inner liquid-permeable section extending in concentric substantially-coextensive relation with the outer section, the exterior peripheral surface of the inner section being in generally distributed but non-continuous contact with the inner peripheral surface of the outer section to provide open spaces therebetween extending longitudinally through the unit between the two sections the inner peripheral surfaces of said cylinder and said inner section of the filter unit being of equal diameter substantially along their entire length, and having a sliding fit with the periphery of said piston, the cylinder wall having drainage passageways contiguous with said open spaces extending from a surface of the shoulder, and means for movably supporting the cylinder head for movement toward and away from its normal position engaging the end of the cylinder whereby the filter unit may be readily withdrawn.

References Cited in the file of this patent

UNITED STATES PATENTS

| Number | Name | Date |
|---|---|---|
| 338,034 | Carter | Mar. 16, 1886 |
| 1,026,876 | McLearn | May 21, 1912 |
| 1,151,186 | Johnson | Aug. 24, 1915 |
| 1,169,559 | Muller | Jan. 25, 1916 |
| 1,247,979 | McHardy et al. | Nov. 27, 1917 |
| 1,448,774 | Stehlin | Mar. 20, 1923 |
| 2,085,695 | Dinzl | June 29, 1937 |
| 2,346,018 | Fulton | Apr. 4, 1944 |